US010212260B2

(12) United States Patent
Sun

(10) Patent No.: US 10,212,260 B2
(45) Date of Patent: Feb. 19, 2019

(54) SERDES ARCHITECTURE WITH A HIDDEN BACKCHANNEL PROTOCOL

(71) Applicant: Credo Technology Group Limited, Grand Cayman (KY)

(72) Inventor: Junqing Sun, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 15/654,446

(22) Filed: Jul. 19, 2017

(65) Prior Publication Data

US 2019/0028574 A1 Jan. 24, 2019

(51) Int. Cl.
*H04L 29/00* (2006.01)
*H04B 10/077* (2013.01)
*H04L 29/06* (2006.01)

(52) U.S. Cl.
CPC .............. *H04L 69/18* (2013.01); *H04L 69/12* (2013.01); *H04B 10/0773* (2013.01); *H04B 10/0775* (2013.01)

(58) Field of Classification Search
CPC . H04L 69/18; H04L 69/12; H04L 1/00; H04L 1/0045; H04L 25/49; H04L 43/08; H04L 49/555; H04L 49/557; H04B 10/0773; H04B 10/0775
See application file for complete search history.

(56) References Cited

U.S. PATENT DOCUMENTS

| 9,106,570 B2 * | 8/2015 | Masood .............. H04L 12/4013 |
| 9,385,859 B2 | 7/2016 | Kuan et al. |
| 2013/0343400 A1 | 12/2013 | Lusted et al. |
| 2014/0086264 A1 | 3/2014 | Lusted et al. |
| 2014/0146833 A1 | 5/2014 | Lusted et al. |

(Continued)

OTHER PUBLICATIONS

"Physical Coding Sublayer (PCS) for 64B/66B, type 50GBASE-R," Draft Amendment to IEEE Std 802.3-2015, Feb. 3, 2017, pp. 132-141, 10 pgs.

(Continued)

*Primary Examiner* — David S Huang
(74) *Attorney, Agent, or Firm* — Ramey & Schwaller LLP

(57) ABSTRACT

An illustrative multi-lane communication method implements a hidden backchannel to communicate equalization information and/or other link-related data without impinging on the user bandwidth allocated by the relevant articles of IEEE Std 802.3. One embodiment is implemented by a transceiver: (a) receiving signals from different receive channels; (b) converting each receive channel signal into a lane of a multi-lane receive data stream via demodulation and error measurement; (c) deriving outgoing backchannel information based at least in part on the error measurement; (d) detecting alignment markers in each lane of the multi-lane receive data stream; (e) extracting incoming backchannel information from a backchannel field following each alignment marker in at least one lane of the multi-lane receive data stream; and (f) modifying the multi-lane receive data stream to obtain a modified multi-lane receive data stream by replacing backchannel fields with PCS (Physical Coding Sublayer) alignment markers, thereby creating sets of grouped PCS alignment markers in said at least one lane.

20 Claims, 6 Drawing Sheets

(56) References Cited

U.S. PATENT DOCUMENTS

| | | |
|---|---|---|
| 2015/0003505 A1 | 1/2015 | Lusted et al. |
| 2016/0323164 A1* | 11/2016 | Cao .................... H04L 43/0811 |
| 2016/0337114 A1 | 11/2016 | Baden et al. |
| 2017/0324657 A1* | 11/2017 | Zhong ..................... H04L 1/00 |
| 2018/0041332 A1* | 2/2018 | Yang .................... H04J 3/0658 |

OTHER PUBLICATIONS

"Physical Medium Attachment (PMA) sublayer, Physical Medium Dependent (PMD) sublayer, and baseband medium, type 100GBASE-KP4," IEEE Standard for Ethernet, Section Six, pp. 481-519, 39 pgs.

"Physical Medium Dependent (PMD) sublayer and baseband medium, type 50GBASE-CR, 100GBASE-CR2, and 200GBASE-CR4," Draft Amendment to IEEE Std 802.3-2015, Feb. 3, 2017, pp. 184-215, 32 pgs.

"Reed-Solomon Forward Error Correction (RS-FEC) sublayer for 50GBASE-R PHYs," Draft Amendment to IEEE Std 802.3-2015, Feb. 3, 2017, pp. 142-159, 18 pgs.

Information Technology—Open Systems Interconnection—Basic Reference Model: The Basic Model, 1994.

International Search Report dated Dec. 6, 2017, in International Application No. PCT/CN17/75961.

Non-Final Office Action dated Jan. 24, 2018, in U.S. Appl. No. 15/487,045.

Reed-Solomon Forward Error Correction (RS-FEC) Sublayer for 100GBASE-R PHYs.

* cited by examiner

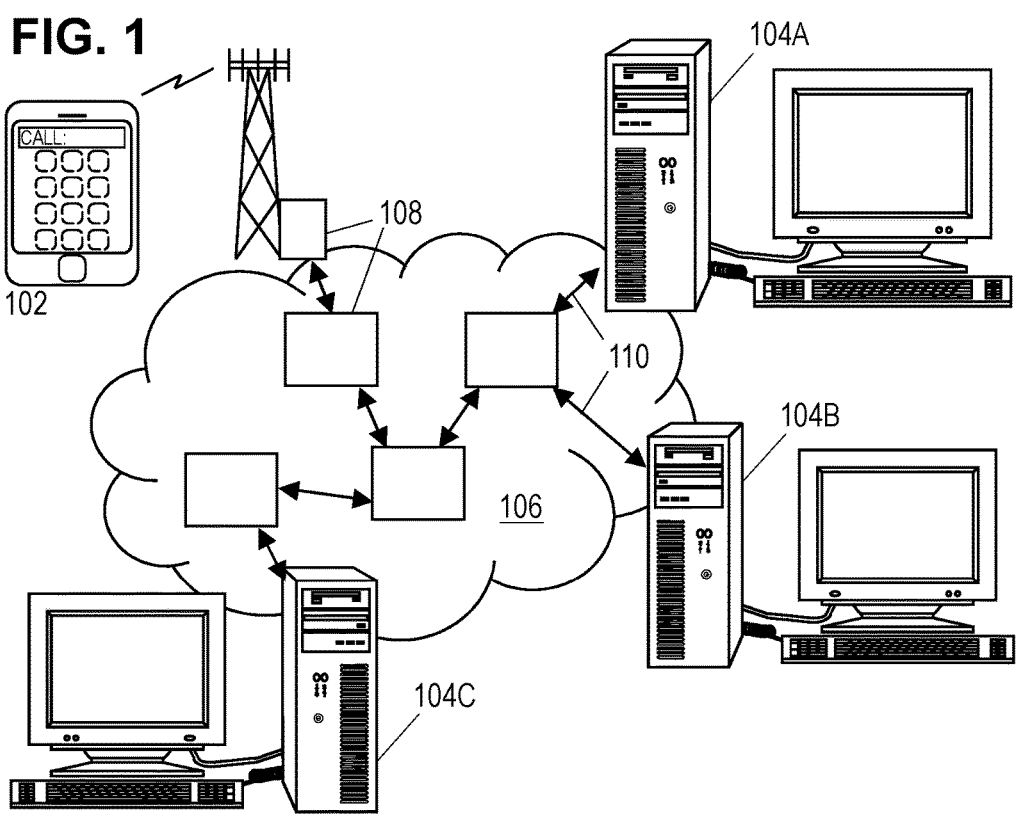

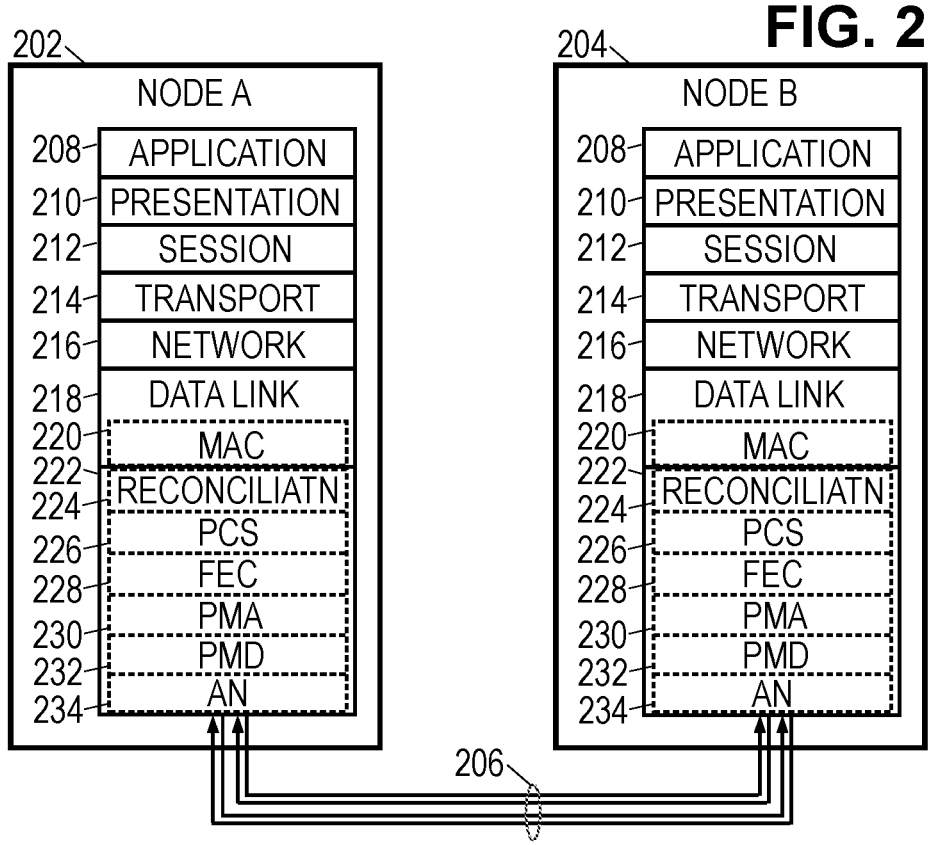
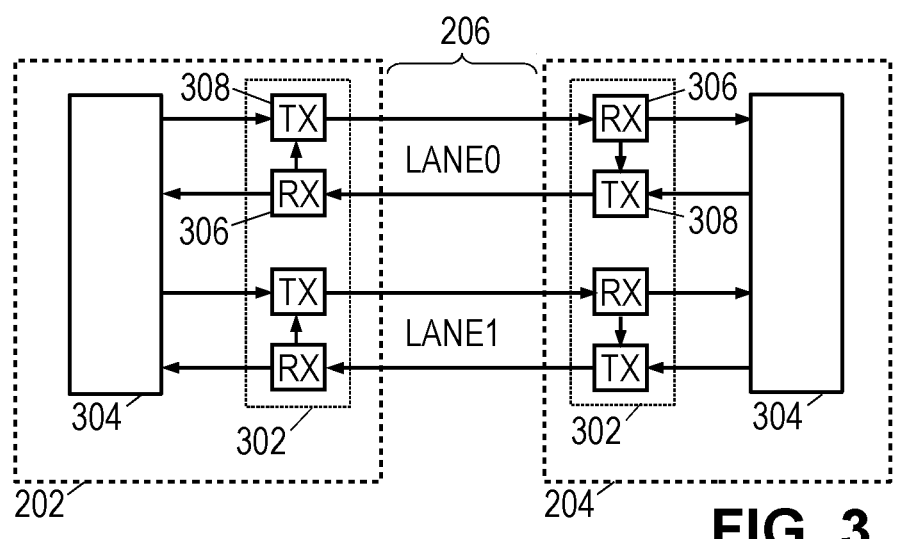

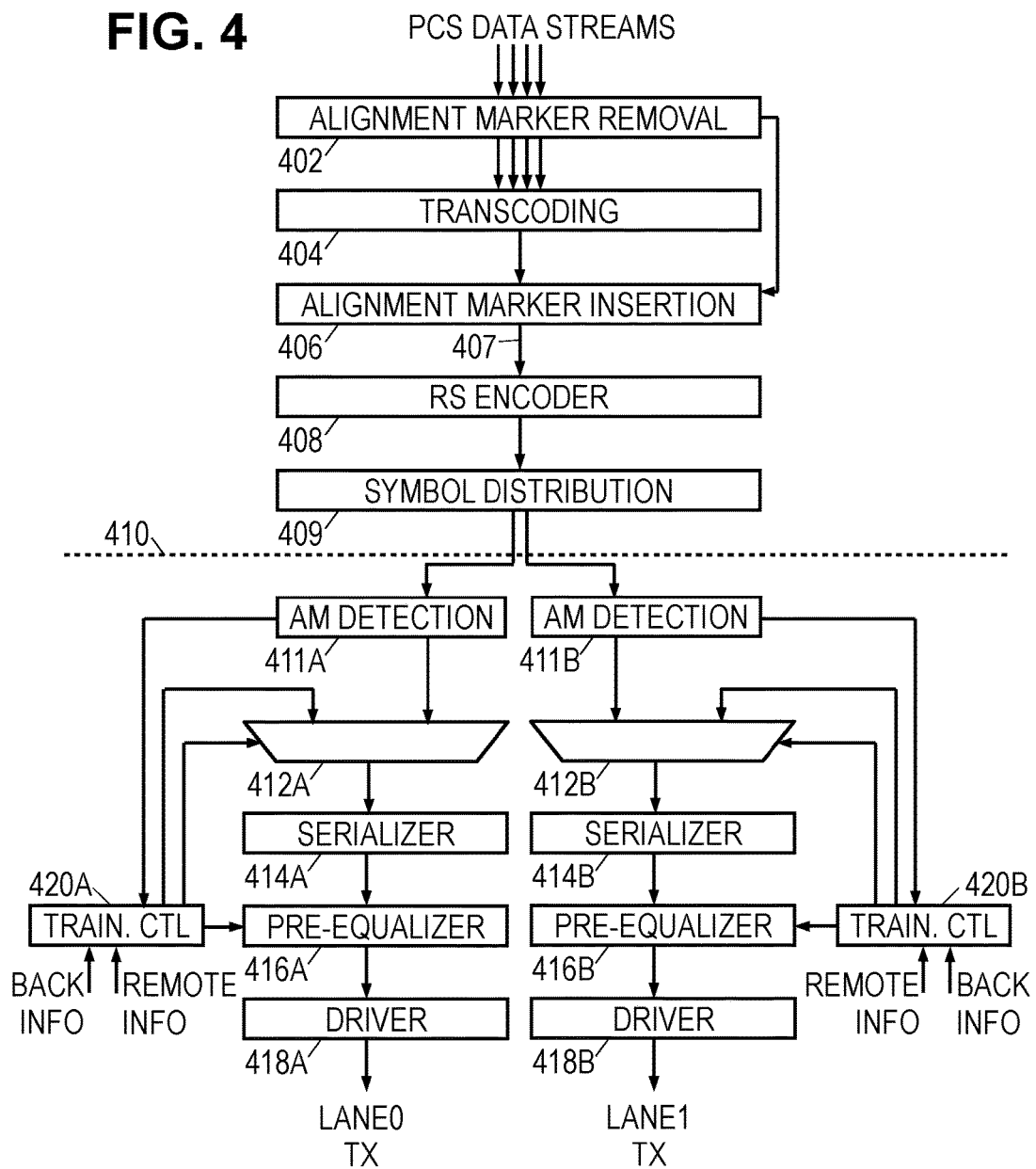

SERDES ARCHITECTURE WITH A HIDDEN BACKCHANNEL PROTOCOL

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This standard provides a common media access control specification for local area network (LAN) operations at selected speeds from 1 Mb/s to 100 Gb/s over coaxial cable, twisted wire pair cable, fiber optic cable, and electrical backplanes, with various channel signal constellations. As demand continues for ever-higher data rates, extensions to the standard must account for increased channel attenuation and dispersion even as the equalizers are forced to operate at faster symbol rates. One potential course of action employs enhanced equalization techniques, but such techniques should minimize consequent limits on data throughput.

SUMMARY

Accordingly, there are disclosed herein a serializer-deserializer (SerDes) architecture and method that implements a hidden backchannel to communicate equalization information and/or other link-related data without impinging on the user bandwidth allocated by the relevant articles of IEEE Std 802.3.

One illustrative multi-lane communications method embodiment is implemented by a transceiver: (a) receiving signals from different receive channels; (b) converting each receive channel signal into a lane of a multi-lane receive data stream via demodulation and error measurement; (c) deriving outgoing backchannel information based at least in part on the error measurement; (d) detecting alignment markers in each lane of the multi-lane receive data stream; (e) extracting incoming backchannel information from a backchannel field following each alignment marker in at least one lane of the multi-lane receive data stream; and (f) modifying the multi-lane receive data stream to obtain a modified multi-lane receive data stream by replacing backchannel fields with PCS (Physical Coding Sublayer) alignment markers, thereby creating sets of grouped PCS alignment markers in said at least one lane.

An illustrative communications transceiver embodiment includes: multiple receivers, one or more adaptation modules, an alignment marker detection module, one or more extraction modules, and a backchannel field replacement module. Each of the multiple receivers receives and demodulates a signal from a corresponding receive channel to provide a data stream corresponding to one lane of a multi-lane receive data stream. The one or more adaptation modules derive error measurements from the demodulation of the receive signals. The alignment marker detection module detects alignment markers in each lane of the multi-lane receive data stream. The one or more extraction modules extract incoming backchannel information from a backchannel field accompanying each alignment marker in at least one lane of the multi-lane receive data stream. The backchannel field replacement module replaces the backchannel fields in the multi-lane receive data stream with PCS alignment markers to create sets of grouped PCS alignment markers in the multi-lane receive data stream.

Each of the foregoing embodiments may be implemented individually or in combination, and may be implemented with any one or more of the following features in any suitable combination: (1) the incoming backchannel information includes adaptation information for a local pre-equalization filter. (2) the outgoing backchannel information includes adaptation information for a remote pre-equalization filter. (3) the outgoing backchannel information includes pre-equalization filter coefficient status information determined by applying adaptation information from the incoming backchannel information to a local pre-equalization filter. (4) providing a host device with a received data stream, said providing including applying a FEC (forward error correction) decoder to the modified multi-lane receive data stream having the sets of grouped PCS alignment markers. (5) adapting one or more coefficients of a local pre-equalization filter based on the incoming backchannel information. (6) locating sets of grouped PCS alignment markers in at least one lane of a multi-lane transmit data stream. (7) modifying the multi-lane transmit data stream to obtain a modified multi-lane transmit data stream having, in place of at least one alignment marker in each set, a backchannel field conveying the outgoing backchannel information. (8) transforming each lane of the multi-lane transmit data stream into a transmit channel signal via modulation and applying the local pre-equalization filter. (9) transmitting the transmit channel signals on different transmit channels. (10) prior to said locating: inserting the sets of grouped PCS alignment markers in at least one lane of a multi-lane outgoing data stream. (11) generating the multi-lane transmit data stream by operating on the multi-lane outgoing data stream with a FEC encoder. (12) each PCS alignment marker includes a bit interleaved parity (BIP) value. (13) at least one of the alignment markers conveys BIP values for two PCS alignment markers. (14) the alignment markers in the multi-lane receive data stream and the modified multi-lane transmit data stream are PCS alignment markers. (15) the backchannel fields each include a BIP value for a replaced PCS alignment marker. (16) prior to said receiving and transmitting, the method includes conducting pre-equalization filter training on each transmit channel independently by: (A) obtaining a receive training signal; (B) converting the receive training signal into a sequence of receive training frames, wherein said converting the receive training signal includes demodulation and training error measurement; (C) extracting local pre-equalizer filter training information from a control field in each receive training frame; (D) using the local pre-equalizer filter training information to adjust one or more coefficients of the local pre-equalization filter; (E) determining remote pre-equalizer training information based at least in part on the training error measurement; (F) generating a sequence of transmit training frames, each transmit training frame including a control field and a training pattern, the control field including the remote pre-equalizer training information; (G) transforming the sequence of transmit training frames into a transmit training signal, wherein said transforming the sequence includes modulating and further includes applying the local pre-equalization filter; and (H) sending the transmit training signal. (17) a coefficient select portion of the control field in each receive training frame and each transmit training frame is wide enough to identify at least 64 coefficients. (18) the size of the backchannel field is equal to the size of a PCS alignment marker. (19) one or more training controllers that update coefficients of local pre-equalization filters using the incoming backchannel information. (20) an alignment marker replacement module that modifies at least one alignment marker in each set of grouped PCS alignment markers in at least one lane of a multi-lane transmit data stream into one or more backchannel fields including remote pre-equalizer adaption information derived from said error measurements. (21) multiple transmitters, each transmitter modulating a data stream corresponding to one lane of the multi-lane transmit data stream and applying one of said local pre-equalization filters to provide a transmit signal to a corresponding transmit channel. (22) an FEC encoder that operates on the multi-lane transmit data stream including the sets of grouped PCS alignment markers to add protection against errors. (23) the alignment marker replacement module provides, in the backchannel fields, local pre-equalization filter coefficient status information determined by applying adaptation information from the incoming backchannel information to a local pre-equalization filter. (24) an FEC (forward error correction) decoder that operates on the multi-lane receive data stream having sets of grouped PCS alignment markers to detect and correct errors in the multi-lane receive data stream. (25) the bit interleaved parity (BIP) value is derived in part from information conveyed by a portion of the multi-lane receive data stream, said portion being between the sets of grouped alignment markers. (26) the one or more training controllers implement independent training phases on each transmit channel prior to sending and receiving of transmit and receive signals conveying multi-lane transmit and receive data streams. (27) during the training phases, the one or more training controllers generate sequences of transmit training frames each including a control field and a training pattern, the control field including remote pre-equalizer training information.

BRIEF DESCRIPTION OF THE DRAWINGS

In the drawing:

FIG. 1 shows an illustrative communications network.

FIG. 2 is a diagram of a point-to-point multi-lane communications link model.

FIG. 3 is a block diagram of an illustrative point-to-point communications link.

FIG. 4 is a block diagram of a transmit chain in an illustrative multi-lane transceiver.

Figure 5:
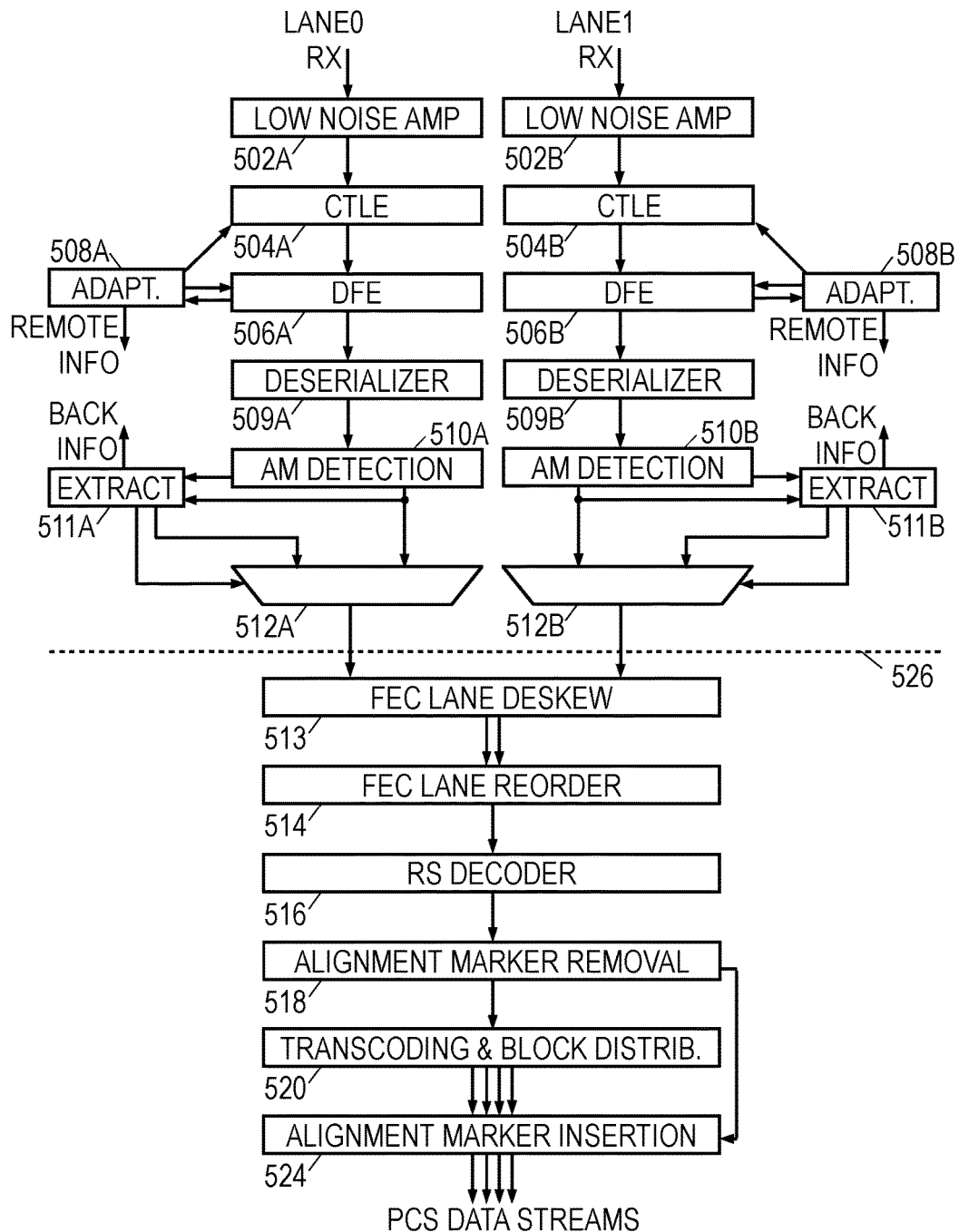
FIG. 5 is a block diagram of a receive chain in an illustrative multi-lane transceiver.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components. At least some of the links 110 in network 106 are high-speed multi-lane links such as Ethernet links operating in compliance with the IEEE Std 802.3-2015 (or later) at 10 Gb/s or more.

FIG. 2 shows a point-to-point communications link between two nodes 202, 204, that operate in accordance with the ISO/IEC Model for Open Systems Interconnection (See ISO/IEC 7498-1:1994.1) to communicate over a physical medium represented by transmit and receive channels 206. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 208 is the uppermost layer in the model, and it represents the user applications or other software operating on different systems (e.g., equipment 108), which need a facility for communicating messages or data. The Presentation Layer 210 provides such applications with a set of application programming interfaces (APIs) that provide formal syntax, along with services for data transformations (e.g., compression), establishing communication sessions, connectionless communication mode, and negotiation to enable the application software to identify the available service options and select therefrom. The Session Layer 212 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 214 provides services for multiplexing, end-to-end sequence control, error detection, segmenting, blocking, concatenation, flow control on individual connections (including suspend/resume), and implementing end-to-end service quality specifications. The focus of the Transport Layer 214 is end-to-end performance/behavior. The Network Layer 216 provides a routing service, determining the links used to make the end-to-end connection and when necessary acting as a relay service to couple together such links. The Data link layer 218 serves as the interface to physical connections, providing delimiting, synchronization, sequence and flow control across the physical connection. It may also detect and optionally correct errors that occur across the physical connection. The Physical layer 222 provides the mechanical, electrical, functional, and procedural means to activate, maintain, and deactivate channels 206, and to use the channels 206 for transmission of bits across the physical media.

The Data Link Layer 218 and Physical Layer 222 are subdivided and modified slightly by IEEE Std 802.3-2015, which provides a Media Access Control (MAC) Sublayer 220 in the Data Link Layer 218 to define the interface with the Physical Layer 222, including a frame structure and transfer syntax. Within the Physical Layer 222, the standard provides a variety of possible subdivisions such as the one illustrated in FIG. 2, which includes an optional Reconciliation Sublayer 224, a Physical Coding Sublayer (PCS) 226, a Forward Error Correction (FEC) Sublayer 228, a Physical Media Attachment (PMA) Sublayer 230, a Physical Medium Dependent (PMD) Sublayer 232, and an Auto-Negotiation (AN) Sublayer 234.

The optional Reconciliation Sublayer 224 merely maps between interfaces defined for the MAC Sublayer 220 and the PCS Sublayer 226. The PCS Sublayer 226 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 222, the PCS alignment markers include Bit-Interleaved-Parity (BIP) values derived from the preceding bits in the lane up to and including the preceding PCS alignment marker.

The FEC Sublayer 228 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 228 modifies the number of lanes. For example, under proposed Article 134, a four-lane outgoing data stream (including PCS alignment markers) may be converted into a two-lane transmit data stream. Conversely, the FEC Sublayer 228 may convert a two-lane receive data stream into a four-lane incoming data stream. In both directions, the PCS alignment markers may be preserved, yielding pairs (or more generally, "sets") of grouped PCS alignment markers in the multi-lane data streams being communicated to and from the PMA Sublayer 230. (Article 91 provides for a 20-to-4 lane conversion, yielding sets of 5 grouped PCS alignment markers in each lane of the data streams communicated between the FEC and PMA sublayers.)

The PMA Sublayer 230 provides lane remapping, symbol encoding/decoding, framing, and octet/symbol synchronization. The PMD Sublayer 232 specifies the transceiver conversions between transmitted/received channel signals and the corresponding bit (or digital symbol) streams. The AN Sublayer 234 implements an initial start-up of the communications channels 206, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities.

More information regarding the operation of the sublayers, as well as the electrical and physical specifications of the connections between the nodes and the communications medium (e.g., pin layouts, line impedances, signal voltages & timing), arrangements of the communications medium (e.g., the network topology), and the electrical and physical specifications for the communications medium itself (e.g., conductor arrangements in copper or fiber optic cable, limitations on attenuation, propagation delay, signal skew), can be found in the standard, and any such details should be considered to be well within the knowledge of those having ordinary skill in the art. The discussion below focuses on modifications specific to the present disclosure.

FIG. 3 provides a block diagram of those portions of nodes 202, 204, that may implement the Data Link Layer 218 and Physical Layer 222. Transceivers 302 for multiple transmit and receive channels are coupled to a host interface 304. The transceivers 302 and host interface 304 may be, e.g., part of a network interface peripheral coupled to the I/O bus of a personal computer, server, network switch, or other network-connected electronic system. The host interface 304 may implement the MAC Sublayer, optional Reconciliation Sublayer, and PCS Sublayer, and elements of the FEC, PMA, and PMD Sublayers, as application-specific integrated circuitry to enable high-rate processing and data transmission. The illustrated transceivers 302, preferably embodied as application-specific integrated circuitry for very high-rate serial data transmission and reception, include multiple pairs of a receiver 306 and transmitter 308, each pair coupled to two unidirectional channels (a receive channel and a transmit channel) to implement one lane of a multi-lane physical connection. The physical connection thus accepts from each node transmit channel signals representing a multi-lane transmit stream and conveys the signals to the other node, delivering them as receive channel signals representing a multi-lane receive data stream. The receive signals may be degraded due to the physical channel's introduction of noise, attenuation, and signal dispersion.

FIGS. 4 and 5 provide a more detailed block diagram of illustrative transmit and receive chains in the sublayers below the PCS. The transmit chain in FIG. 4 accepts a four-lane data stream from the PCS. Pursuant to the standard, the PCS data stream is already encoded with a transmission code that provides DC balance and enables timing recovery. The PCS data stream lanes further include PCS alignment markers for synchronizing the lanes with each other. Once the data stream lanes are aligned, an alignment marker removal module 402 removes the alignment markers from each lane, passing them to a downstream alignment marker insertion module 406. A transcoding module 404 modifies the transmission code from a 64b/66b code to a 256b/257b code more appropriate for use with the Reed-Solomon encoder. By repeatedly transcoding four 66-bit blocks taken in parallel from the four incoming lanes into individual 257-bit blocks, the transcoding module may essentially convert the four lanes into a single lane data stream.

The previously-mentioned alignment marker insertion module 406 accepts the PCS alignment marker information from removal module 402 and the single-lane data stream from transcoding module 404. The insertion module 406 combines the alignment marker information from the four lanes in a manner discussed further below a set of grouped alignment markers in a 257-bit block and, accounting for the operation of the transcoding module 404, inserts the alignment block in a fashion that preserves its location relative to the other data in the data stream 407. As described further with respect to FIGS. 7A-7C, the alignment block is designed to account for the operation of the encoder module 408 and symbol distribution modules 409 such that the alignment markers appear essentially intact and in order in the two-lane transmit data stream crossing boundary 410.

A Reed-Solomon (RS) encoder module 408 operates on 10-bit "symbol" blocks of the data stream 407 from the insertion module 406, adding redundancy to enable downstream correction of symbol errors. Typically, the encoder module 408 operates to preserve the original data stream content while appending so-called "parity" information, e.g., 30 parity symbol blocks appended to 514 data symbol blocks to form a complete code word block. Thus the alignment blocks inserted by module 406 will remain present in the output data-stream from the encoder module. A symbol distribution module 409 distributes code word symbols across multiple transmission lanes in round-robin fashion, directing each lane to a corresponding transmitter.

Boundary 410 may be considered as the boundary between the FEC sublayer 228 and the PMA sublayer 230. Where it is desired to maintain this boundary as strongly as possible, the PMA sublayer may include an alignment marker detection module 411A (and 411B) for each lane of the transmit data stream to detect the alignment markers inserted by module 406 with suitable data buffering. Alternatively, this boundary can be relaxed and the alignment marker detection modules 411A, 411B omitted in favor of appropriate direct signaling from the alignment marker insertion module 406. In either case, the training control modules 420A, 420B control the multiplexers 412A, 412B in each lane, based at least in part on detection signals indicating the presence of the alignment markers.

Multiplexers 412A, 412B forward the encoded data streams to serializer modules 414A, 414B during normal operations and in the absence of alignment markers. During auto-negotiation and training phases, the multiplexers supply negotiation and training data streams from the training control modules 420A, 420B to the serializers. During normal operations in the presence of alignment markers, the multiplexers 412A, 412B (acting as alignment marker replacement modules) supply the serializer modules with modified alignment markers as discussed further below. The serializers 414A, 414B, each accept a stream of transmit data blocks and convert the stream of blocks into a (higher-rate) stream of channel symbols. Where, for example, a 4-PAM signal constellation, each serializer may produce a stream of two-bit symbols.

Each stream of channel symbols is filtered by a pre-equalizer module 416A, 416B to produce a transmit signal, which is amplified and supplied to the transmit channel by a driver 418A, 418B. The pre-equalizer modules compensate for at least some of the channel dispersion, reducing or eliminating the need for receiver-side equalization. Such pre-equalization may be advantageous in that it avoids the noise enhancement often associated with receiver-side equalization and enables digital filtering with a reduced bit-width. The bit width reduction directly reduces power consumption by requiring a less complex filter, but may further reduce power consumption by obviating the parallelization that a more complex filter might require to operate at the required bandwidth. However, pre-equalization generally requires knowledge of the channel.

One or more training controllers 420A, B, operate to characterize the channel after conducting an initial auto-negotiation phase. During the auto-negotiation phase, at least one training controller generates a sequence of auto-negotiation frames conveying capabilities of the local node to the remote node and negotiating to select a combination of features to be used for subsequent communications. When the auto-negotiation phase is complete, each training controller generates a sequence of training frames, so that training is carried out independently on each of the lanes.

Figure 6A:
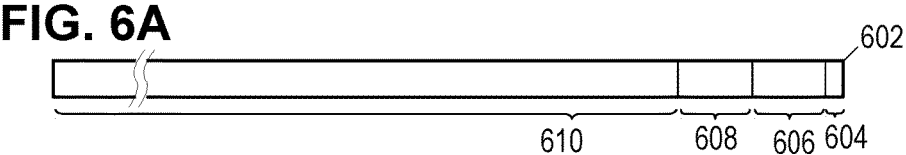
FIGS. 6A-6C show fields of an illustrative training frame.

An illustrative training frame 602 is now described with reference to FIGS. 6A-6C. The training frame 602 begins with a frame marker 604 indicating the start of the training frame. The frame marker 604 is followed by a coefficient update field 606, a status report field 608, and a training pattern 610. Unlike the training pattern, which provides a spectrally-dense channel symbol sequence to facilitate training, the preceding fields are sent using differential Manchester encoding to facilitate timing recovery and ensure reliable communication even with untrained equalizers.

Figure 6B:
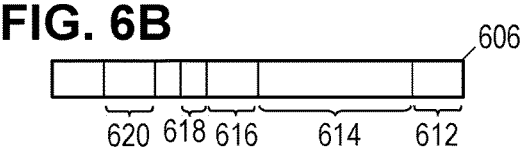

FIG. 6B shows an illustrative coefficient update field 606, having a two-bit request field 612 to indicate whether a selected coefficient should be incremented, decremented, maintained at the present value, or disabled; a six-bit selection field 614 to select one of up to 64 pre-equalizer coefficients; a two-bit modulation field 616 to select a desired modulation scheme (e.g., 2-PAM, 4-PAM, with or without precoding); a one-bit filter length field 618 to indicate whether the pre-equalization filter should be short (no more than four coefficients) or long (more than four coefficients); and a two-bit initialization request field 620 to select a pre-programmed set of pre-equalization coefficient values. The unlabeled fields may be reserved for future use. The training controller(s) may use the coefficient update field 606 to convey backchannel information, i.e., adjustments to the pre-equalization filter coefficients of the remote transmitter.

Figure 6C:
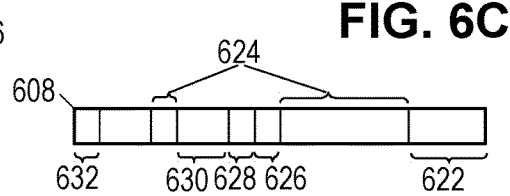

FIG. 6C shows an illustrative status report field 608, having a three-bit coefficient status field 622 to report a successful update to a coefficient, an unsuccessful update, or an error condition (e.g., coefficient not supported, maximum voltage or coefficient limit reached); a one-bit and five-bit (totaling six bit) coefficient selection echo field 624 to echo back the coefficient selection from the remote node; a one bit initial condition status field 626 to report successful or unsuccessful setting of the coefficient values to an initial set of preprogrammed values; a one-bit lock status field 628 to indicate whether the receiver has achieved frame lock; a modulation status field 630 to report which modulation scheme is being employed by the transmitter; and a one-bit receiver ready field 632 to indicate whether the local node has finished training and is ready to begin data transmission. The training controller(s) may use the status report field 608 to convey confirmations and other local status information to the remote node.

Returning to FIG. 4, the one or more training controllers 420A, B, receive backchannel information extracted by the receiver from the received data stream and use the backchannel information to adjust the coefficients of the pre-equalization filters. The controllers further receive "remote info", which includes locally-generated information for adapting the coefficients of the pre-equalization filter in the remote node. Based on this information the controllers populate the coefficient selection field 614 and request field 612 of the training frames to provide backchannel information to the remote node. As training frames are employed only during the training phase, and as it may be desirable to continue updating the pre-equalization filter during normal operations, the training controller(s) 420 may include similar backchannel information in or with the modified alignment markers supplied via multiplexers 412A, 412B during normal operations.

Figure 7A:
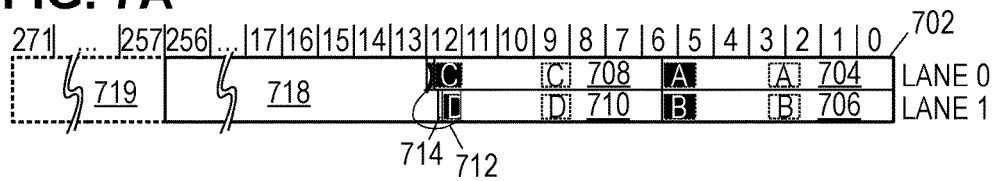
FIG. 7A shows sets of grouped alignment markers in an illustrative multi-lane data stream.

Though shown as a single lane, the 10-bit symbol blocks of data stream 407 can conceptually be arranged into two lanes in anticipation of the operation of symbol distribution module 409, which places adjacent symbol blocks in alternate lanes. FIG. 7A shows a 514 symbol message word 702 (corresponding to the length of twenty 257-bit blocks from transcoding module 404) in this fashion, with broken outline for the 30 parity symbols 719 to be appended by the Reed-Solomon encoder 408 to form a complete 544 symbol code word. The spacing of the alignment markers in the four-lane PCS data stream is such that when a set of grouped alignment markers are inserted in the data stream 407, the grouped alignment markers form the first 257 bits of a message word 702 (and also the first 257 bits of the resulting Reed-Solomon codeword) while data blocks 718 occupy the remainder of the message word. Within these 257 bits, the information from the four PCS data stream alignment markers are arranged in alternating 10-bit symbol blocks so that within each lane the information appears, in order, and as essentially intact PCS alignment markers 704, 706, 708, and 710. As the four 64-bit alignment markers fall one bit short of the 257-bit length of blocks put out by the transcoding module, a one-bit pad 714 is appended to the grouped alignment markers. Moreover, within these first 257 bits of the message word 702, the alignment markers don't align well with the 10-bit symbol block boundaries. To fill out a full 10-bit symbol in lane 0, a 2-bit portion of marker 710 is excerpted from position 712.

The alignment markers in the four lane PCS data stream carry bit-interleaved parity values (A, B, C, D in inverted and non-inverted versions) and employ unique marker (UM) patterns that are lane specific. The alignment insertion module 406 modifies the pattern of alignment marker 706 to agree with that of alignment marker 704, so that they share a common marker (CM) pattern to facilitate detection and synchronization of the two lanes at the receiver. The BIP values are preserved. While alignment makers 708, 710 could in theory be used to make the synchronization process more robust, their presence is only necessary for identifying lanes at the beginning of the communications process and thereafter only to convey the contents of their BIP fields. Once the lanes have been identified, the lane-specific patterns for markers 708, 710 are redundant and these patterns may be omitted to make room for backchannel information. Thus multiplexers 412A, 412B, optionally with the support of alignment marker detection modules 411A, 411B, may replace the sets of grouped alignment markers with modified versions as shown in FIGS. 7B-7D.

In some embodiments, the replacements begin only after a "settling period" (e.g., for one second after the multi-lane communications begin) or after a predetermined number (e.g., 100) of grouped alignment markers have been sent, with all sets of grouped alignment markers being modified thereafter. In other embodiments, the replacements occur periodically, with 1 out of every 2 sets being replaced, or 2 out of 3, or (N-1) out of N, with N potentially ranging as high as $10^5$ to provide at least one unmodified set on the order of once per second. In still other embodiments, the replacement may occur on an as-needed basis, e.g., when degradation or drift is observed in the performance of the equalizers. In these as-needed embodiments, the replacements may begin upon detection of the reduced performance and continue until training convergence is achieved.

Figure 7B:
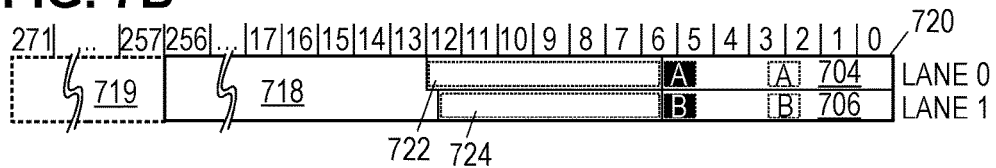
FIG. 7B shows a first data stream embodiment having hidden backchannel fields.
Figure 7C:
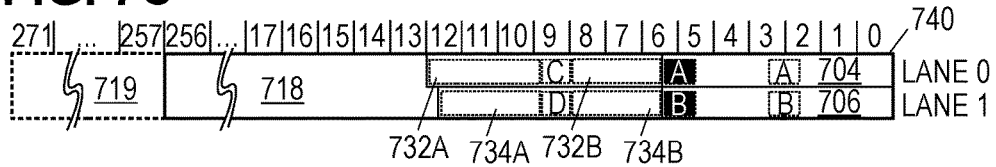
FIG. 7C shows a second data stream embodiment having hidden backchannel fields.
Figure 7D:
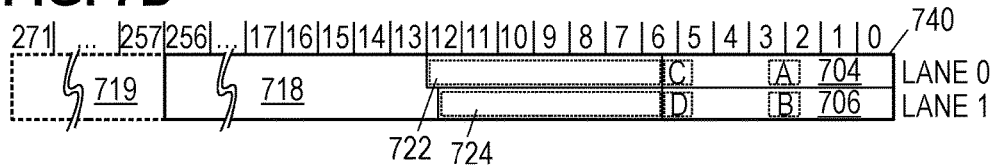
FIG. 7D shows a third data stream embodiment having hidden backchannel fields.

In FIG. 7B the UM alignment markers 708 and 710 are replaced in their entireties by a backchannel adaptation field 722 having 66 bits and a backchannel status field 724 having 63 bits (including the former pad bit 714). At the receiver, the backchannel information is extracted and the alignment markers 708, 710 restored with placeholders for the lost BIP (inverted and non-inverted) values. With SerDes systems employing forward error correction, the BIP values are no longer essential for determining bit error rates, and in this implementation the BIP values are sacrificed for additional backchannel bandwidth that will not substantively impact the operation or throughput of the higher sublayers and layers.

Nevertheless, different implementations may be employed to prevent the loss of BIP values in the restored alignment markers. In FIG. 7C, the UM patterns and inverted BIP values are dropped from alignment markers 708, 710 while the non-inverted BIP values are left in place. The UM patterns and inverted BIP values are replaced by an adaptation field 732A, 732B (for marker 708) and a status field 734A, 734B. This approach preserves alignment markers 704 and 706 unchanged from the markers inserted by module 406 while reallocating 56 bits from each of markers 708, 710 for hidden backchannel fields 732, 734. At the receiver, the backchannel information is extracted and the alignment markers 708, 710 restored (and the BIP values preserved) without impact on the operation or throughput of the higher sublayers and layers.

In FIG. 7D, alignment markers 704, 706 are modified to replace their inverted BIP values with the non-inverted BIP values from alignment markers 708, 710. Their CM patterns remain unaffected so that the standard synchronization process still functions. Meanwhile, additional space is made available for backchannel information. As in FIG. 7B, backchannel adaptation field 722 has 66 bits while backchannel status field 724 has 63 bits (including the former pad bit 714). At the receiver, the backchannel information is extracted and the alignment markers 704, 706, 708, 710 are fully restored (and the BIP values preserved) without impact on the operation or throughput of the higher sublayers and layers.

As with the training frame, the backchannel information field(s) of the modified alignment markers may provide a six-bit field for selecting pre-equalization filter coefficients; a two-bit field for specifying that the selected coefficient should be incremented, decremented, maintained, or disabled; and perhaps a one-bit field for indicating whether the backchannel information field contains a valid command or should be ignored. The backchannel information field(s) may further provide a status report, with a six-bit field for echoing a filter coefficient selection; a two-bit field for indicating whether the coefficient has been updated, not updated, is at its limit, or is not supported; and perhaps a one-bit field for indicating that the receiver has obtained a lock on the lane alignments.

In an alternative embodiment, each coefficient of the pre-equalization filter may have a bit pair allocated within the modified alignment markers to indicate (in the adaptation field) whether that coefficient should be incremented, decremented, maintained, or disabled; or (in the status field) to indicate whether that coefficient is maximized, minimized, updated, or not updated.

As with the training frame, the backchannel information fields of the modified alignment markers may be encoded using differential Manchester encoding to ensure reliable delivery. Additionally, or alternatively, reliability of the backchannel information field delivery may be enhanced using other techniques. For example, the backchannel information field may be sent redundantly, using multiple copies of a field to enable error detection and (for three or more copies) voting-based error correction. (Notably, a standards-compliant alignment marker includes a bitwise-inverted duplication of each element, which can be extended to include the backchannel information field. If an odd number of copies is desired, the last field may be partly inverted.) A parity check or short FEC code may also provide controlled redundancy enabling the detection and possible correction of bit errors.

Having discussed the transmit chain and the fields (including hidden fields 722-724 or 732-734) potentially employed to communicate backchannel information during the training and normal operations phases, we turn now to the operation of an illustrative receive chain such as that shown in FIG. 5. The receive chain obtains analog electrical signals from different receive channels (indicated by Lane0-rx and Lane1-rx). These may be obtained directly from electrical conductors, if the physical medium is an electrical bus or cable, or indirectly via transducers if the physical medium is wireless. Low noise amplifiers (LNA) 502A,B, each provide a high input impedance to minimize channel loading and amplifies the receive signal to drive the input of a continuous time linear equalizer (CTLE) filter 504A,B.

CTLE filters 504A,B provide continuous time filtering to shape the receive signal spectrum in an adaptive fashion to reduce the length of the channel impulse response while minimizing leading inter-symbol interference (ISI). Decision feedback equalizers (DFE) 506A,B operate on the filtered signals to correct for trailing ISI and detect each transmitted channel bit or symbol, thereby producing a demodulated digital data stream. Some embodiments employ oversampling. Clock recovery and adaptation modules 508A,B derive a sampling clock signal from the input and/or output of the DFE's decision element and supply it back to the DFE to control timing of the symbol detection. The adaptation modules 508A,B further derive an error signal of the DFE decision element's input relative to the output or (during the training phase) to a known training pattern, and use the error signal to adapt the DFE coefficient(s) and the response of the CTLE filters. The adaptation modules still further use the error signal to generate "remote info", i.e., adaptation information for the remote pre-equalizers. This remote info is supplied to the training controller(s) 420 (FIG. 4).

Deserializers 509A,B group the digital receive data stream bits or symbols into blocks to enable the use of lower clock rates for subsequent on-chip operations. Alignment marker detection modules 510A, 510B monitor the receive data stream to detect the CM pattern of the alignment markers and achieve alignment marker lock during normal operations, or during training operations to detect the training frame markers and achieve lock thereto. The backchannel information extraction modules 511A, 511B extract the backchannel information from the appropriate portions of the training frames and alignment markers, providing the pre-equalizer adaptation information and status report information to the training controller(s) 420. During normal operations, the multiplexers 512A, 512B, operating under control of the extraction modules 511A, 511B, replace the modified alignment markers with sets of grouped PCS alignment markers, thereby hiding the backchannel information fields from the higher layers. As with the transmit chain, the receive chain may impose a hard boundary 526 between the PMA sublayer and the FEC sublayer, or alternatively, the alignment marker detection information may be communicated to the FEC lane deskew module 513.

During normal operations, the receive data streams from the deserializers are aligned by an FEC lane deskew module 513. If the FEC lanes have somehow gotten switched, an FEC lane reordering module 514 detects the switch based on the contents of the alignment markers and compensates for the switch as the two lanes are multiplexed on a symbol-block basis into a single lane. An RS decoder module 516 operates on the single lane data stream to detect and correct any symbol errors, removing the FEC coding redundancy (parity symbols) during the decoding process.

A transcoding module 520 converts the 256b/257b transmission code words into blocks of four 64b/66b transmission code words distributing the 66-bit code word blocks across four PCS lanes. An alignment marker insertion module 524 converts the sets of grouped alignment markers into individual alignment markers having lane-specific UM patterns, and inserts the individual alignment markers at appropriate positions in the four lanes, accounting for the operation of the transcoding module 520. The four lane PCS data stream is provided to the higher hierarchy layers of the node for eventual communication of the conveyed data to the destination application.

With a sufficiently long pre-equalization filter, the DFE feedback filter may be kept quite short, at say 1 or 2 taps, and even when the channel has a relatively lengthy channel response, the pre-equalization filter may obviate any need for a digital feed forward equalizer (FFE) filter. In this case, the power savings associated with this architecture is expected to be substantial. With temperature changes and general evolution of the channel, however, ongoing adaptation of the pre-equalization filter (i.e., during the normal operations phase) is expected to be necessary.

Figure 8:
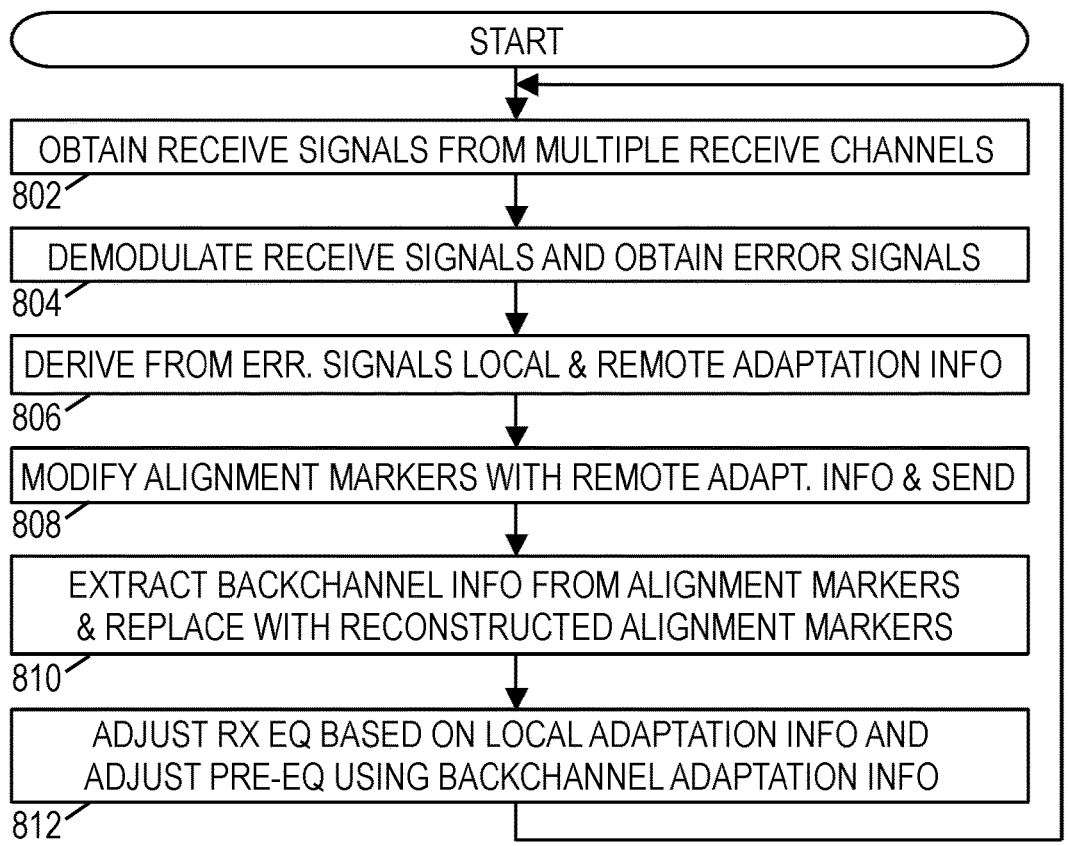
FIG. 8 is a flowchart of an illustrative multi-lane communications method.

FIG. 8 is a flow diagram of the illustrative method. In block 802, the transceiver obtains receive signals on different receive channels. In block 804, the receive signals are demodulated, e.g., with a DFE, to obtain error signals. The demodulated data streams are later combined to form a multi-lane data stream carrying user data to a destination application. In block 806, adaptation information is derived from the error signal in accordance with any applicable adaptation algorithm that may be found in the open literature. The adaptation information may be applicable to the CTLE filter, any FFE filter that may be present, and the feedback filter of the DFE (referred to herein as "local" adaptation info), as well as to the pre-equalization filter of the remote node (referred to herein as "remote" adaptation info). In block 808, sets of grouped alignment markers are modified to accommodate backchannel information fields that may include the remote adaptation info, enabling the backchannel information to be periodically inserted into the multi-lane transmit data stream. In block 810, the contents of the backchannel information field are extracted from the received (modified) alignment markers, yielding adaptation information for the local pre-equalizer. The modified alignment markers are then replaced with reconstructed sets of grouped PCS alignment markers. In block 812, the local adaptation information and the backchannel information are used to adjust the receive equalizers (CTLE, DFE, and FFE if any) and the local transmit pre-equalizer.

Numerous alternative forms, equivalents, and modifications will become apparent to those skilled in the art once the above disclosure is fully appreciated. For example, the foregoing description suggests specific locations and bit-widths for fields, yet any suitable location and width that can be standardized and agreed upon may be employed. For example, adaptation and status information fields may be present in each lane rather than limiting the adaption information to one lane and the status information to the other. It is intended that the claims be interpreted to embrace all such alternative forms, equivalents, and modifications that are encompassed in the scope of the appended claims.

What is claimed is:

1. A multi-lane communications method that comprises, in a transceiver:
   receiving receive channel signals from different receive channels;
   converting each receive channel signal into a lane of a multi-lane receive data stream, wherein said converting includes demodulation and error measurement;
   deriving outgoing backchannel information based at least in part on the error measurement;
   detecting alignment markers in each lane of the multi-lane receive data stream;

extracting incoming backchannel information from a backchannel field following each alignment marker in at least one lane of the multi-lane receive data stream; and modifying the multi-lane receive data stream to obtain a modified multi-lane receive data stream, said modifying including replacing backchannel fields with PCS (Physical Coding Sublayer) alignment markers, thereby creating sets of grouped PCS alignment markers in said at least one lane.

2. The method of claim 1, wherein the incoming backchannel information includes adaptation information for a local pre-equalization filter, and wherein the outgoing backchannel information includes adaptation information for a remote pre-equalization filter.

3. The method of claim 2, wherein the outgoing backchannel information includes pre-equalization filter coefficient status information determined by applying adaptation information from the incoming backchannel information to a local pre-equalization filter.

4. The method of claim 1, further comprising:
providing a host device with a received data stream, said providing including applying a FEC (forward error correction) decoder to the modified multi-lane receive data stream having the sets of grouped PCS alignment markers.

5. The method of claim 1, further comprising:
adapting one or more coefficients of a local pre-equalization filter based on the incoming backchannel information;
locating sets of grouped PCS alignment markers in at least one lane of a multi-lane transmit data stream;
modifying the multi-lane transmit data stream to obtain a modified multi-lane transmit data stream having, in place of at least one PCS alignment marker in each set, at least one backchannel field conveying the outgoing backchannel information;
transforming each lane of the multi-lane transmit data stream into a transmit channel signal, wherein said transforming includes modulating and further includes applying the local pre-equalization filter; and
transmitting the transmit channel signals on different transmit channels.

6. The method of claim 5, further comprising, prior to said locating:
inserting said sets of grouped PCS alignment markers in at least one lane of a multi-lane outgoing data stream; and
generating the multi-lane transmit data stream by operating on the multi-lane outgoing data stream with a FEC encoder.

7. The method of claim 5, wherein each PCS alignment marker includes a bit interleaved parity (BIP) value, and wherein an alignment marker in the modified multi-lane transmit data stream conveys BIP values for two PCS alignment markers.

8. The method of claim 5, wherein the alignment markers in the multi-lane receive data stream and the modified multi-lane transmit data stream are PCS alignment markers, and wherein the backchannel fields each include a BIP value for a replaced PCS alignment marker.

9. The method of claim 5, wherein prior to said receiving and transmitting, the method comprises conducting pre-equalization filter training on each transmit channel independently by:
obtaining a receive training signal;
converting the receive training signal into a sequence of receive training frames, wherein said converting the receive training signal includes demodulation and training error measurement;
extracting local pre-equalizer filter training information from a control field in each receive training frame;
using the local pre-equalizer filter training information to adjust one or more coefficients of the local pre-equalization filter;
determining remote pre-equalizer training information based at least in part on the training error measurement;
generating a sequence of transmit training frames, each transmit training frame including a control field and a training pattern, the control field including the remote pre-equalizer training information;
transforming the sequence of transmit training frames into a transmit training signal, wherein said transforming the sequence includes modulating and further includes applying the local pre-equalization filter; and
sending the transmit training signal.

10. The method of claim 9, wherein a coefficient select portion of the control field in each receive training frame and each transmit training frame is wide enough to identify at least 64 coefficients.

11. A communications transceiver that comprises:
multiple receivers, each receiver receiving and demodulating a receive signal from a corresponding receive channel to provide a data stream corresponding to one lane of a multi-lane receive data stream;
one or more adaptation modules that derive error measurements from the receive signals;
an alignment marker detection module that detects alignment markers in each lane of the multi-lane receive data stream;
one or more extraction modules that extract incoming backchannel information from a backchannel field accompanying each alignment marker in at least one lane of the multi-lane receive data stream; and
a backchannel field replacement module that replaces the backchannel fields in the multi-lane receive data stream with PCS alignment markers to create sets of grouped PCS alignment markers in the multi-lane receive data stream.

12. The transceiver of claim 11, further comprising one or more training controllers that update coefficients of local pre-equalization filters using the incoming backchannel information.

13. The transceiver of claim 12, further comprising an alignment marker replacement module that replaces at least one alignment marker in each set of grouped PCS alignment markers in at least one lane of a multi-lane transmit data stream with a backchannel field including remote pre-equalizer adaption information derived from said error measurements.

14. The transceiver of claim 13, further comprising multiple transmitters, each transmitter modulating a data stream corresponding to one lane of the multi-lane transmit data stream and applying one of said local pre-equalization filters to provide a transmit signal to a corresponding transmit channel.

15. The transceiver of claim 14, further comprising an FEC encoder that operates on the multi-lane transmit data stream including the sets of grouped PCS alignment markers to add protection against errors.

16. The transceiver of claim 12, wherein the alignment marker replacement module provides, in the backchannel fields, local pre-equalization filter coefficient status information determined by applying adaptation information from the incoming backchannel information to a local pre-equalization filter.

17. The transceiver of claim 11, further comprising an FEC (forward error correction) decoder that operates on the multi-lane receive data stream having sets of grouped PCS alignment markers to detect and correct errors in the multi-lane receive data stream.

18. The transceiver of claim 17, wherein each PCS alignment marker in each set includes a bit interleaved parity (BIP) value derived in part from information conveyed a portion of the multi-lane receive data stream, said portion being between the sets of grouped alignment markers.

19. The transceiver of claim 12, wherein the one or more training controllers implement independent training phases on each transmit channel prior to sending and receiving of transmit and receive signals conveying multi-lane transmit and receive data streams, and wherein during the training phases, the one or more training controllers generate sequences of transmit training frames each including a control field and a training pattern, the control field including remote pre-equalizer training information.

20. The transceiver of claim 19, wherein a coefficient select portion of the control field in each transmit training frame is wide enough to identify at least 64 coefficients of a remote pre-equalization filter.

* * * * *